United States Patent
Ye et al.

(10) Patent No.: US 12,542,732 B2
(45) Date of Patent: Feb. 3, 2026

(54) METHOD FOR DELIVERING IFIT CONFIGURATION THROUGH BGP, ELECTRONIC DEVICE AND STORAGE MEDIUM

(71) Applicant: NEW H3C TECHNOLOGIES CO., LTD., Zhejiang (CN)

(72) Inventors: Jinrong Ye, Beijing (CN); Yuanxiang Qiu, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 2 days.

(21) Appl. No.: 18/713,849

(22) PCT Filed: Mar. 30, 2022

(86) PCT No.: PCT/CN2022/084008
§ 371 (c)(1),
(2) Date: May 28, 2024

(87) PCT Pub. No.: WO2023/184218
PCT Pub. Date: Oct. 5, 2023

(65) Prior Publication Data
US 2025/0030623 A1    Jan. 23, 2025

(51) Int. Cl.
*H04L 45/02* (2022.01)
*H04L 45/00* (2022.01)

(52) U.S. Cl.
CPC .............. *H04L 45/04* (2013.01); *H04L 45/34* (2013.01)

(58) Field of Classification Search
None
See application file for complete search history.

(56) References Cited

U.S. PATENT DOCUMENTS

2018/0109450 A1    4/2018    Filsfils et al.
2021/0226879 A1    7/2021    Indiresan et al.

FOREIGN PATENT DOCUMENTS

| CN | 112804075 A | * | 5/2021 | ......... H04L 41/0895 |
| CN | 113315645 A | * | 8/2021 | .......... H04L 43/0811 |

OTHER PUBLICATIONS

BGP SR Policy Extensions to Enable IFIT: Draft-ietf-idr-sr-policy-ifit-03 F. Qin China Mobile, H. Yuan UnionPay, T. Zhou, G. Fioccola, Y. Wang Huawei (Year: 2022).*
ISA State Intellectual Property Office of the People's Republic of China, International Search Report Issued in Application No. PCT/CN2022/084008, Dec. 8, 2022, WIPO, 4 pages.
European Patent Office, Extended European Search Report Issued in Application No. 22934072.4, Nov. 28, 2024, Germany, 13 pages.

(Continued)

*Primary Examiner* — Natisha D Cox
(74) *Attorney, Agent, or Firm* — Greenblum & Bernstein, P.L.C.

(57) ABSTRACT

The present application provides a method for delivering in-situ flow information telemetry (IFIT) configuration through a border gateway protocol (BGP), an electronic device and a storage medium. In an example of the present disclosure, by extending the BGP UPDATE packet in the BGP, the extended BGP UPDATE packet carries the IFIT parameters and is dynamically delivered to the headend in the SR policy, which realizes that the network device can dynamically deliver the IFIT parameters based on the BGP.

15 Claims, 2 Drawing Sheets

(56) References Cited

OTHER PUBLICATIONS

F. Qin et al, "BGP SR Policy Extensions to Enable IFIT draft-ietf-idr-Sr-policy-ifit-03", XP015149610, Jan. 10, 2022, 17 pages.

Y.Wang et al:"BGP Extension for Advertising In-situ Flow Information Telemetry (IFIT) Capabilities draft-wang-idr-bgp-ifit-capabilities-04", XP015150972, Mar. 7, 2022, 10 pages.

K. Zhang et al:"BGP SR Policy Extensions for metric draft-zhang-idr-sr-policy-metric-00", XP015150616, Mar. 5, 2022, 7 pages.

ISA State Intellectual Property Office of the People's Republic of China, Written Opinion of the International Searching Authority Issued in Application No. PCT/CN2022/084008, Dec. 8, 2022, WIPO, 6 pages.

* cited by examiner

METHOD FOR DELIVERING IFIT CONFIGURATION THROUGH BGP, ELECTRONIC DEVICE AND STORAGE MEDIUM

CROSS REFERENCE TO RELATED APPLICATIONS

This application is a U.S. national phase application of International Application No. PCT/CN2022/084008, filed on Mar. 30, 2022, the disclosure of which is incorporated herein by reference in its entirety for all purposes.

TECHNICAL FIELD

The present disclosure relates to network communication technology, and in particular to a method applied to delivering in-situ flow information telemetry (IFIT) configuration through a border gateway protocol (BGP), an electronic device and a storage medium.

BACKGROUND

In-situ flow information telemetry (IFIT) refers to the detection utilizing a normally forwarded service flow. In the specific implementation, an IFIT option can be inserted into the normally forwarded service flow. A forwarding device can obtain corresponding detection data based on the IFIT option and report it to an analyzer. The analyzer can analyze subtle anomalies in the network based on the detection data, accurately detect the delay, packet loss and other performance information of each service flow; so that the service level agreement (SLA) network quality can be visualized in real time, and rapid fault delimitation and location can be achieved.

SUMMARY

The examples of the present application provide a method for delivering in-situ flow information telemetry (IFIT) configuration through a border gateway protocol (BGP), an electronic device and a storage medium, so as to realize the delivering of the IFIT configuration through the BGP.

An example of the present disclosure provides a method for delivering the IFIT configuration through the BGP, which is applied to a network device. The method includes: obtaining a headend in a segment routing (SR) policy; and delivering a BGP update packet to the headend through a BGP connection with the headend; where the BGP update packet at least carries IFIT parameters, which at least include a service flow identifier of a service flow to be performed the IFIT.

An example of the present disclosure also provides an electronic device, including a processor and a machine-readable storage medium, where the machine-readable storage medium stores machine executable instructions executable by the processor, and the processor is configured to execute the machine executable instructions to perform operations including: obtaining a headend in a segment routing (SR) policy; and delivering a BGP update packet to the headend through a BGP connection with the headend; where the BGP update packet at least carries IFIT parameters, which at least include a service flow identifier of a service flow to be performed the IFIT.

an obtaining unit, configured to obtain a headend in a segment routing (SR) policy; and An example of the present disclosure also provides a non-transitory machine-readable storage medium, storing computer instructions, where when the computer instructions are executed by a processor, the following operations are performed: obtaining a headend in a segment routing (SR) policy; and delivering a BGP update packet to the headend through a BGP connection with the headend; where the BGP update packet at least carries IFIT parameters, which at least include a service flow identifier of a service flow to be performed the IFIT.

It can be seen from the above technical solution that in the examples of the present disclosure, by extending the BGP UPDATE packet in the BGP, the extended BGP UPDATE packet carries the IFIT parameters and is dynamically delivered to the headend in the SR policy, which realizes that the network device can dynamically deliver the IFIT parameters based on the BGP.

BRIEF DESCRIPTION OF THE DRAWINGS

The accompanying drawings, which are incorporated in and constitute a part of the specification, illustrate examples consistent with the present disclosure and, together with the specification, serve to explain the principles of the present disclosure.

DETAILED DESCRIPTION OF THE EXAMPLES

Figure 1:
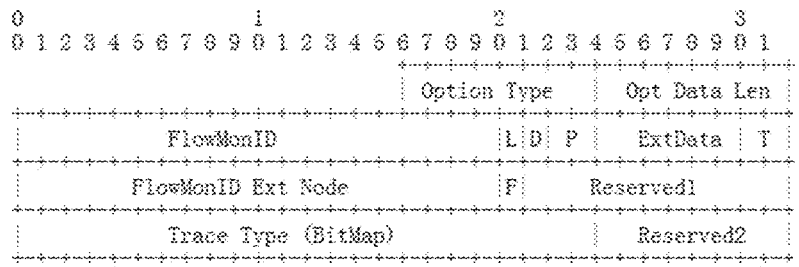
FIG. 1 is a schematic diagram illustrating an IFIT option according to an example of the present disclosure.

Examples will be described in detail herein, with the illustrations thereof represented in the drawings. When the following descriptions involve the drawings, like numerals in different drawings refer to like or similar elements unless otherwise indicated. The implementations described in the following examples do not represent all examples consistent with the present disclosure. Rather, they are merely examples of apparatuses and methods consistent with some aspects of the present disclosure.

The terms used in the present disclosure are for the purpose of describing particular examples only, and are not intended to limit the present disclosure. Terms "a", "the" and "said" in the singular form used in the present disclosure are also intended to include plurality; unless otherwise clearly indicated in the context.

As described in the background, in-situ flow information telemetry (IFIT) is performed based on a service flow. In specific implementation, when a headend of the service flow identifies a service packet that needs to be performed the IFIT (the service packet that needs to be performed the IFIT can be identified according to predefined packet characteristics), an IFIT option will be inserted into the service flow. Optionally, in this example, the IFIT option can be added in a destination options header (DOH) of IPv6 encapsulated by the service packet.

Herein, the IFIT option carries parameters for indicating the IFIT, which at least includes IFIT parameters. FIG. 1 illustrates the IFIT parameters carried by the IFIT option.

The IFIT option shown in FIG. 1 at least includes the following parameters.

Option type (Option Type), which is used for indicating the type of the option. Optionally; in this example, the option type can occupy 8 bits.

Option data length (Opt Data Len), which is used for indicating the data length of the IFIT option. Optionally, in this example, the option data length can occupy 8 bits.

Service flow identifier (FlowMonID), which is used for indicating the service flow identifier. Optionally, in this example, the service flow identifier can occupy 20 bits.

Packet loss measurement dye flag (L Flag), which can occupy 1 bit.

Delay measurement dye flag (D Flag), which can occupy 1 bit. When D Flag is set to a first value, such as 1, it is required to report timestamp information to an analyzer.

Measurement period (T), which can occupy 2 bits. For example, a value of 00 indicates 10 seconds(s), a value of 01 indicates 30 s, a value of 10 indicates 60 s, and a value of 11 indicates 300 s.

Extended data type (ExtData), which can occupy 6 bits. For example, if a value of the extended data type is 000000, it indicates that the extended data is not carried; if the extended data type takes other values, it indicates that the extended data is carried.

Detection type (T), which can occupy 2 bits, and is used for indicating the detection type. For example, when a value of the detection type is 01, it indicates end-to-end detection; when the value of the detection type is 10, it indicates hop-by-hop detection.

Device node identifier (NodeMonID), which can occupy 20 bits, and is used for indicating the node identifier of the headend.

Service flow direction flag (F Flag), which can occupy 1 bit. For example, when a value of the service flow direction flag is a preset value, such as 1, it indicates a forward service flow.

Reserved field (Reserved), which can occupy 11 bits.

Report data indicator bit (Trace Type), which can occupy 24 bits, and is represented by a bitmap and is used for indicating the data type to be reported to the analyzer.

The IFIT option is described in the above examples.

However, in applications, the IFIT parameters carried by the above IFIT option are all configured through command line or Netconf API (Application Programming Interface). However, both command line and Netconf API are difficult to adapt to dynamically changing networks.

Based on this, an example of the present disclosure provides a method for dynamically configuring the IFIT parameters. Optionally, in this example, the IFIT parameters can be dynamically configured by extending a border gateway protocol (BGP). The description is as follows.

Figure 2:
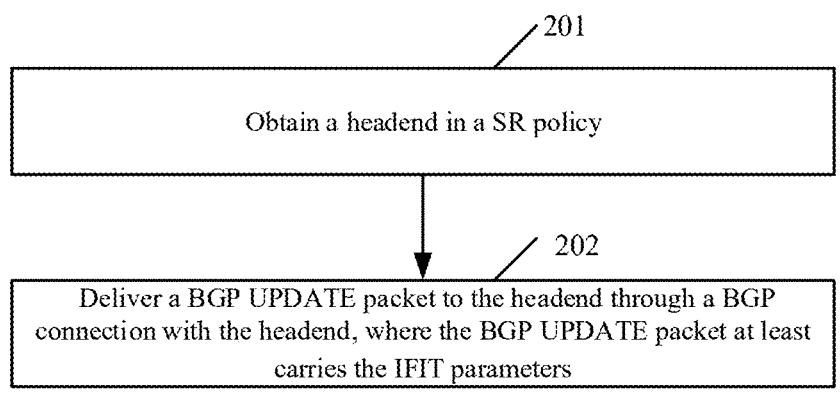
FIG. 2 is a flowchart illustrating a method according to an example of the present disclosure.

Please refer to FIG. 2, which is a flowchart of a method according to an example of the present disclosure. This method is applied to a network device. Herein, the network device can be a designated device in a network for delivering the IFIT parameters, such as a controller, or one of designated routers.

As shown in FIG. 2, the process can include the following steps.

Step 201, a headend in a segment routing (SR) policy is obtained.

Optionally; in this example, the above network device can be a device designated to delivery the SR policy.

In an example, an SR policy is identified by the following triplet.

Headend: a headend node of the SR policy.

Color: an arbitrary 32-bit value, which is used for distinguishing the SR policy.

Endpoint: an endpoint of the SR policy, which can be an IPv4/IPv6 address.

Based on the triplet of the SR policy described above, in step 201, when the SR policy is obtained (for example, an externally configured SR policy, etc. is received), it is easy to determine the headend in the SR policy based on the obtained SR policy.

Step 202, a BGP update (UPDATE) packet is delivered to the headend through a BGP connection with the headend, where the BGP UPDATE packet at least carries the IFIT parameters.

In this example, by extending the BGP UPDATE packet in the BGP, the extended BGP UPDATE packet carries the IFIT parameters. In the specific implementation, the IFIT parameters (Parameters) can be extended and carried by means of a SR policy subsequent address family identifier (SAFI) network layer reachability information (NLRI) field newly added in the BGP UPDATE packet. For example, the SR policy SAFI NLRI field carries a tunnel encapsulation attribute (Tunnel Encaps Attribute) whose Tunnel-Type is SR policy Type (with a value of 15), and the above IFIT Parameters are extended as one of sub-type-length-values (sub-TLVs) of the Tunnel Encaps Attribute.

Below is an example of the IFIT Parameters in the SR policy SAFI NLRI field.

The coding structure of the SR policy SAFI NLRI field is as follows:

SR policy SAFI NLRI: <Distinguisher, Policy-Color, Endpoint>
  Attributes:
    Tunnel Encaps Attribute (23) //this field takes a value of 23
      Tunnel Type: SR policy (15) //this field takes a value of 15, indicating the SR policy;
      Binding SID //Tunnel Encaps Attribute sub-TLV
      SRv6 Binding SID //Tunnel Encaps Attribute sub-TLV
      Preference //Tunnel Encaps Attribute sub-TLV
      Priority //Tunnel Encaps Attribute sub-TLV
      Policy Name //Tunnel Encaps Attribute sub-TLV
      Policy Candidate Path Name //Tunnel Encaps Attribute sub-TLV
      Explicit NULL Label Policy (ENLP) //Tunnel Encaps Attribute sub-TLV
      IFIT Parameters //Tunnel Encaps Attribute sub-TLV
      Segment List //Tunnel Encaps Attribute sub-TLV
        Weight
        Segment
        Segment
        . . .
        . . .

It should be noted that in this example, although the IFIT Parameters are used as a Tunnel Encaps Attribute sub-TLV, their specific locations is not limited, such as in front of and behind all other Tunnel Encaps Attribute sub-TLVs, and is not specifically limited in this example.

Figure 3:
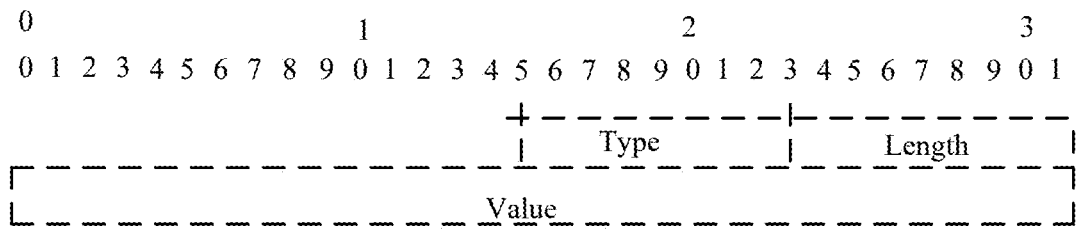
FIG. 3 is a schematic diagram illustrating a format of an IFIT parameters sub-TLV according to an example of the present disclosure.

As described above, the IFIT Parameters, as a Tunnel Encaps Attribute sub-TLV (referred to as IFIT Parameters Sub-TLV for short), meet the TLV in format, as shown in FIG. 3.

In FIG. 3, Type refers to the type of the IFIT Parameters Sub-TLV, which can be defined by internet assigned numbers authority (IANA), for example, the value can be 6, which is not specifically limited in this example.

Length, which indicates the length of the IFIT Parameters Sub-TLV. For example, it can be 4 bits.

Value, which represents the IFIT parameters carried by the IFIT Parameters Sub-TLV.

Optionally, in this example, the IFIT parameters can be set according to the actual IFIT to be performed. For example, the IFIT parameters can at least include: a service flow identifier of the service flow to be performed the IFIT, etc., and are not specifically limited in this example.

Optionally, in this example, if the IFIT parameters include parameters shown in Table 1:

TABLE 1

| Field | Description |
| --- | --- |
| FlowMonID (e.g. occupying 20 bits) | service flow identifier, which is unique in the headend device of the SR policy. |
| Period (e.g. occupying 2 bits) | measurement period. For example, values and periods represented by the values are as follows: 00:10 s; 01:30 s; 10:60 s; 11:300 s |
| T (e.g. occupying 2 bits) | identifies the type of the IFIT, values and types of the IFIT represented by the values are as follows: 00: reserved; 01: end-to-end detection; 10: hop-by-hop detection; 11: reserved |
| NodeMonID (e.g. occupying 20 bits) | node identifier of the headend in the SR policy, which is unique in the whole IFIT system. |
| Trace Type (e.g. occupying 24 bits) | report data indicator bit, which can be represented by a bitmap, is used for identifying the data type to be reported to the analyzer (i.e., the data type of data for the IFIT). |

Figure 4:
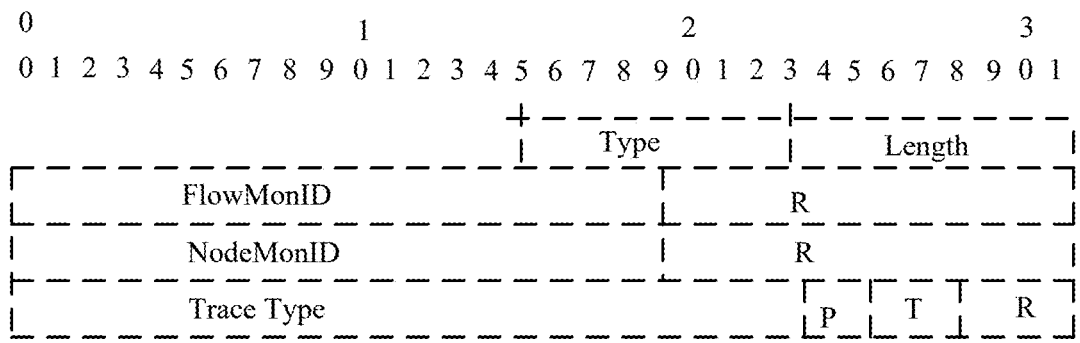
FIG. 4 is a schematic diagram illustrating an IFIT parameters sub-TLV according to an example of the present disclosure.

Optionally, the coding structure of the above IFIT Parameters Sub-TLV can be as shown in FIG. 4. In FIG. 4, R is a reserved field.

Finally, through the above step 202, it is realized that the network device can dynamically deliver the IFIT parameters based on the BGP.

Optionally, in this example, in order to save bandwidth resources, the timing when the network device delivers the BGP UPDATE packet to the headend can be that it is detected that the SR policy parameters of the SR policy need to be delivered to the headend. That is, when the network device detects that it is necessary to deliver the SR policy parameters of the SR policy to the headend, the network device can further deliver the above BGP UPDATE packet to the headend while delivering the SR policy parameters to the headend.

Optionally, in this example, the network device can also carry the above SR policy parameters in the above BGP UPDATE packet and deliver them to the headend.

In this example, after obtaining the IFIT parameters based on the above BGP UPDATE packet, if the headend, as an ingress node, recognizes that the IFIT is needed for the service packet according to predefined characteristics when receiving the service packet, the headend inserts the IFIT option similar to that shown in FIG. 1 into the service packet, and collects target statistical data based on the measurement type carried by the IFIT option and reports it to the analyzer. If the IFIT option does not carry the measurement type, target statistical data can be collected based on the default measurement type and reported to the analyzer. For example, the target statistical data reported by the headend is shown in Table 2.

TABLE 2

| Report Information | Is it necessary to carry | Desription |
| --- | --- | --- |
| FlowMonID | Yes | flow identifier |
| FlowNodeID | Yes | flow node identifier |
| Address Family | Yes | address type, IPv4 or IPV6 |
| Source IP | No | source IP Address |
| Source IP Mask Length | No | source IP address mask length |
| Destination IP | No | destination IP address |
| Destination IP Mask Length | No | destination IP address mask length |
| Source Port | No | source port number, 0 is an invalid value |
| Destination Port | No | destination port number, 0 is an invalid value |
| Protocol | No | protocol number |
| VPN Name | No | VPN instance name |
| Direction | Yes | flow direction 1-Ingress 2-TransInput 3-TransOutput 4-Egress |
| IfIndex | Yes | inbound direction or outbound direction interface index |
| PeriodID | Yes | period ID, which is a number of seconds from 1970 to the start of the statistical period divided by Period, and used for marking the same time period throughout the network |
| Period | Yes | statistical period, in seconds, and values are 1 s, 30 s, 60 s, 300 s |
| PacketCount | No | number of packets in a period |
| TimestampSecond | No | integer value of the second part from 1970 to the time of receiving delay measurement packet |
| TimestampNanoSecond | No | remaining nanosecond portion |

After receiving the above service packet, if an intermediate node (Transmit) finds that the service packet carries the IFIT option, the intermediate node collects target statistical data based on the measurement type carried by the IFIT option, reports the target statistical data to the analyzer, and continues to forward the service packet. If the IFIT option does not carry the measurement type, target statistical data can be collected based on the default measurement type and reported to the analyzer. For example, the target statistical data reported by the intermediate node is shown in Table 3.

TABLE 3

| Report Information | Is it necessary to bring | Description |
| --- | --- | --- |
| FlowMonID | Yes | flow identifier |
| FlowNodeID | Yes | flow node identifier |
| Direction | Yes | flow direction 1-Ingress 2-TransInput 3-TransOutput 4-Egress |
| IfIndex | Yes | inbound direction or outbound direction interface index |
| PeriodID | Yes | period ID, which is a number of seconds from 1970 to the start of the statistical period divided by Period, and used for marking the same time period throughout the network |
| Period | Yes | statistical period, in seconds, and values are 1 s, 30 s, 60 s, 300 s |

TABLE 3-continued

| Report Information | Is it necessary to bring | Description |
|---|---|---|
| PacketCount | No | number of packets in a period |
| TimestampSecond | No | integer value of the second part from 1970 to the time of receiving delay measurement packet |
| TimestampNanoSecond | No | remaining nanosecond portion |

After receiving the above service packet, if an egress node (Egress) finds that the service packet carries the IFIT option, the egress node collects target statistical data based on the measurement type carried by the IFIT option, reports the target statistical data to the analyzer, then removes the IFIT option carried by the service packet and continues to forward the service packet. If the IFIT option does not carry the measurement type, target statistical data can be collected based on the default measurement type and reported to the analyzer. The target statistical data reported by the egress node are similar to Table 3.

The analyzer (Analyzer) is responsible for collecting statistical data reported by the ingress node, one or more intermediate nodes, and the egress node, and completing summary and calculation of the data. For example, the analyzer calculates the packets loss number of the service flow in the i-th period according to the statistical data reported by the ingress node and the egress node: PacketLoss[i]=Tx[i]−Rx[i]. Tx[i] represents the number of packets of the service flow sent in the i-th period reported by the ingress node, Rx[i] represents the number of packets of the service flow received in the i-th period reported by the egress node, and PacketLoss[i] represents the packets loss number of the service flow in the i-th period. For another example, the analyzer calculates the two-way delay of the i-th period according to the statistical data reported by the ingress node and the egress node: Delay[i]=one-way delay of forward service flow+one-way delay of reverse service flow.

Figure 5:
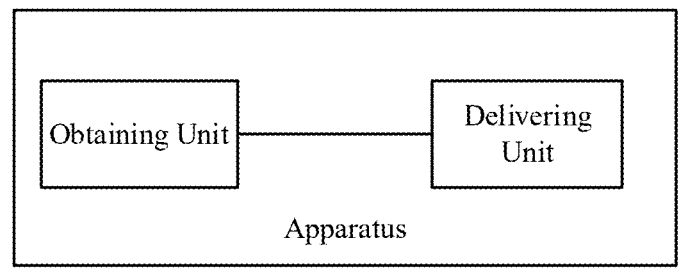
FIG. 5 is a schematic structural diagram illustrating an apparatus according to an example of the present disclosure.

The method provided by the examples of the present disclosure has been described above. The apparatus provided by the examples of the present disclosure is described below:

Refer to FIG. 5, which is a schematic structural diagram illustrating an apparatus according to an example of the present disclosure. The apparatus is applied to a network device, as shown in FIG. 5, the apparatus 500 can include:
  an obtaining unit 501, configured to obtain a headend in a segment routing (SR) policy; and
  a delivering unit 502, configured to deliver a BGP update packet to the headend through a BGP connection with the headend; where the BGP update packet at least carries IFIT parameters, which at least include a service flow identifier of a service flow to be performed the IFIT.

Optionally, in this example, the delivering unit 502 delivers the BGP update packet to the headend through the BGP connection with the headend when it is detected that SR policy parameters of the SR policy need to be delivered to the headend.

Optionally; in this example, the BGP update packet further carries the SR policy parameters.

Optionally, in this example, the BGP update packet carries a SR policy subsequent address family identifier (SAFI) network layer reachability information (NLRI) field; and the IFIT parameters are carried in the SR policy SAFI NLRI field in the BGP update packet.

Optionally; in this example, the SR policy SAFI NLRI field includes a tunnel encapsulation attribute; and
  the IFIT parameters serve one of sub-type-length-values (sub-TLVs) of the tunnel encapsulation attribute.

Optionally; in this example, the IFIT parameters further includes:
  a node identifier of the headend; and/or,
  an IFIT period; and/or,
  an IFIT type, which at least includes end-to-end detection and hop-by-hop detection; and/or,
  a data type indicator bit, which is for indicating a data type of data for the IFIT.

Figure 6:
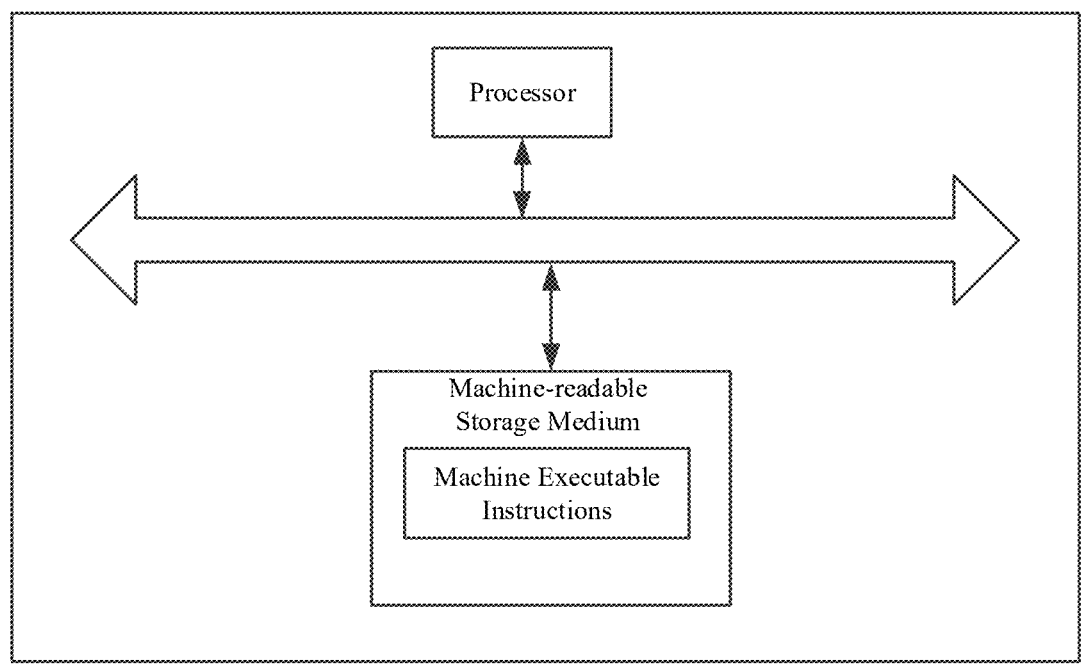
FIG. 6 is a schematic structural diagram illustrating an electronic device according to an example of the present disclosure.

The examples of the present disclosure also provide the hardware structure of the apparatus shown in FIG. 5. Refer to FIG. 6, which is a schematic structural diagram illustrating an electronic device 600 according to an example of the present disclosure. As shown in FIG. 6, the hardware structure can include a processor 601 and a machine-readable storage medium 602 which stores machine executable instructions that can be executed by the processor 601. The processor 601 is configured to execute machine executable instructions to implement the methods disclosed in the above examples of the present application.

Based on the same application concept as the above method, an example of the present disclosure also provides a machine-readable storage medium, the machine-readable storage medium stores a number of computer instructions, and when the computer instructions are executed by a processor, the methods disclosed in the above examples of the present disclosure can be implemented.

As an example, the machine-readable storage medium can be any electronic, magnetic, optical, or other physical storage device, which can contain or store information, such as executable instructions, data, and so on. For example, the machine-readable storage medium can be a Radom Access Memory (RAM), a volatile memory, a non-volatile memory, a flash memory, a storage drive (such as a hard drive), a solid state drive, and any type of storage disk (such as CD, DVD, or the like), or similar storage media, or a combination thereof.

The systems, devices, modules, or units explained in the above examples can be implemented by computer chips or entities, or implemented by products with certain functions. A typical implementation device is a computer. The specific form of the computer can be a personal computer, a laptop computer, a cellular phone, a camera phone, a smart phone, a personal digital assistant, a media player, a navigation device, an email receiving and sending device, and a game console, a tablet computer, a wearable device, or a combination of any of these devices.

For the convenience of description, when describing the above device, the functions are divided into various units and described separately. Of course, when implementing the present disclosure, the functions of each unit can be implemented in the same or multiple software and/or hardware.

Those skilled in the art should understand that the examples of the present disclosure can be provided as methods, systems, or computer program products. Therefore, the present disclosure can adopt the form of a complete hardware example, a complete software example, or an example combining software and hardware. Moreover, the examples of the present disclosure can adopt the form of computer program products implemented on one or more computer-usable storage media (including but not limited to disk storage, CD-ROM, optical storage, or the like) containing computer-usable program codes.

The present disclosure is described with reference to flowcharts and/or block diagrams of methods, devices (systems), and computer program products according to examples of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor or other programmable data processing device to generate a machine, so that the instructions executed by the processor of the computer or other programmable data processing device generate an apparatus for implementing functions designated in one or more flows of the flowcharts and/or one or more blocks of the block diagrams.

Moreover, these computer program instructions can also be stored in a computer-readable memory that can guide a computer or other programmable data processing device to work in a specific manner, so that the instructions stored in the computer-readable memory generate manufactured products, the instruction device realizes the functions specified in one or more processes in the flowchart and/or one or more blocks in the block diagram.

These computer program instructions can also be loaded on a computer or other programmable data processing device, so that a series of operation steps are executed on the computer or other programmable device to produce computer-implemented processing, so that the instructions executed on the computer or other programmable device provide steps for implementing the functions specified in one or more processes in the flowchart and/or one or more blocks in the block diagram.

The above descriptions are only examples of the present disclosure, and are not intended to limit the present disclosure. For those skilled in the art, the present disclosure can have various modifications and changes. Any modification, equivalent replacement, improvement, or the like made within the spirit and principle of the present disclosure shall be included in the scope of the claims of the present disclosure.

The invention claimed is:

1. A method for delivering in-situ flow information telemetry (IFIT) configuration through a border gateway protocol (BGP), the method being applied to a network device and comprising:
    obtaining a headend in a segment routing (SR) policy; and
    delivering a BGP update packet to the headend through a BGP connection with the headend; wherein the BGP update packet at least carries IFIT parameters, wherein the IFIT parameters at least comprise:
    a service flow identifier of a service flow to be performed the IFIT, which is unique in the headend of the SR policy;
    a node identifier of the headend of the SR policy;
    an IFIT period;
    an IFIT type, which at least comprises end-to-end detection and hop-by-hop detection; and
    a data type indicator bit, which is for indicating a data type of data for the IFIT.

2. The method according to claim 1, wherein the delivering the BGP update packet to the headend through the BGP connection with the headend is performed when it is detected that SR policy parameters of the SR policy need to be delivered to the headend.

3. The method according to claim 2, wherein the BGP update packet further carries the SR policy parameters.

4. The method according to claim 1, wherein the BGP update packet carries a SR policy subsequent address family identifier (SAFI) network layer reachability information (NLRI) field; and
    the IFIT parameters are carried in the SR policy SAFI NLRI field in the BGP update packet.

5. The method according to claim 4, wherein the SR policy SAFI NLRI field comprises a tunnel encapsulation attribute; and
    the IFIT parameters serve one of sub-type-length-values (sub-TLVs) of the tunnel encapsulation attribute.

6. An electronic device, comprising a processor and a machine-readable storage medium, wherein the machine-readable storage medium stores machine executable instructions executable by the processor, and the processor is configured to execute the machine executable instructions to perform operations comprising:
    obtaining a headend in a segment routing (SR) policy; and
    delivering a BGP update packet to the headend through a BGP connection with the headend;
    wherein the BGP update packet at least carries IFIT parameters, wherein the IFIT parameters at least comprise:
    a service flow identifier of a service flow to be performed the IFIT, which is unique in the headend of the SR policy;
    a node identifier of the headend of the SR policy;
    an IFIT period;
    an IFIT type, which at least comprises end-to-end detection and hop-by-hop detection; and
    a data type indicator bit, which is for indicating a data type of data for the IFIT.

7. The electronic device according to claim 6, wherein the delivering the BGP update packet to the headend through the BGP connection with the headend is performed when it is detected that SR policy parameters of the SR policy need to be delivered to the headend.

8. The electronic device according to claim 7, wherein the BGP update packet further carries the SR policy parameters.

9. The electronic device according to claim 6, wherein the BGP update packet carries a SR policy subsequent address family identifier (SAFI) network layer reachability information (NLRI) field; and
    the IFIT parameters are carried in the SR policy SAFI NLRI field in the BGP update packet.

10. The electronic device according to claim 9, wherein the SR policy SAFI NLRI field comprises a tunnel encapsulation attribute; and
    the IFIT parameters serve one of sub-type-length-values (sub-TLVs) of the tunnel encapsulation attribute.

11. A non-transitory machine-readable storage medium, storing computer instructions, wherein when the computer instructions are executed by a processor, the following operations are performed:
    obtaining a headend in a segment routing (SR) policy; and
    delivering a BGP update packet to the headend through a BGP connection with the headend; wherein the BGP update packet at least carries IFIT parameters, wherein the IFIT parameters at least comprise:
    a service flow identifier of a service flow to be performed the IFIT, which is unique in the headend of the SR policy;
    a node identifier of the headend of the SR policy;
    an IFIT period;

an IFIT type, which at least comprises end-to-end detection and hop-by-hop detection; and a data type indicator bit, which is for indicating a data type of data for the IFIT.

12. The storage medium according to claim 11, wherein the delivering the BGP update packet to the headend through the BGP connection with the headend is performed when it is detected that SR policy parameters of the SR policy need to be delivered to the headend.

13. The storage medium according to claim 12, wherein the BGP update packet further carries the SR policy parameters.

14. The storage medium according to claim 11, wherein the BGP update packet carries a SR policy subsequent address family identifier (SAFI) network layer reachability information (NLRI) field; and the IFIT parameters are carried in the SR policy SAFI NLRI field in the BGP update packet.

15. The storage medium according to claim 14, wherein the SR policy SAFI NLRI field comprises a tunnel encapsulation attribute; and the IFIT parameters serve one of sub-type-length-values (sub-TLVs) of the tunnel encapsulation attribute.

* * * * *